United States Patent [19]

Cherian et al.

[11] Patent Number: 5,230,787
[45] Date of Patent: Jul. 27, 1993

[54] SPRING AND PROCESS FOR MAKING A SPRING FOR A FLUID BEARING BY ELECTROFORMING

[75] Inventors: Abraham Cherian, Webster; William G. Herbert, Williamson; Peter J. Schmitt, Ontario, all of N.Y.

[73] Assignee: Xerox Corporation, Stamford, Conn.

[21] Appl. No.: 814,637

[22] Filed: Dec. 30, 1991

[51] Int. Cl.⁵ ............................................. C25D 1/02
[52] U.S. Cl. ...................................................... 205/67
[58] Field of Search ......................................... 205/67

[56] References Cited

U.S. PATENT DOCUMENTS

| | | | |
|---|---|---|---|
| 3,795,427 | 3/1974 | Licht et al. | 308/9 |
| 3,844,906 | 10/1974 | Bailey et al. | 204/9 |
| 4,116,503 | 9/1978 | Licht | 308/9 |
| 4,133,585 | 1/1979 | Licht | 308/9 |
| 4,295,689 | 10/1981 | Licht | 308/9 |
| 4,415,281 | 11/1983 | Agrawal | 384/103 |
| 4,462,700 | 7/1984 | Agrawal | 384/105 |
| 4,501,646 | 2/1985 | Herbert | 204/4 |
| 4,552,466 | 11/1985 | Warren | 384/103 |
| 4,678,691 | 7/1987 | Herbert et al. | 428/36 |
| 4,871,267 | 10/1989 | Gu | 384/105 |
| 4,950,089 | 8/1990 | Jones | 384/103 |

Primary Examiner—T. M. Tufariello
Attorney, Agent, or Firm—Oliff & Berridge

[57] ABSTRACT

An electroforming process is used to prepare a thin, deformable metal member by immersing an electrode having an outer surface with an undulating cross-section of hill-like and valley-like shapes in an electroforming bath. The hill-like shapes are narrower than the valley-like shapes, and, in a preferred embodiment, the bottoms of the valley-like shapes are electroformed to be thinner than the tops of the hill-like shapes. The metal member is useful as a spring in a fluid bearing such as an air bearing.

18 Claims, 3 Drawing Sheets

SPRING AND PROCESS FOR MAKING A SPRING FOR A FLUID BEARING BY ELECTROFORMING

This invention relates to a thin, deformable metal member useful as a spring in a fluid bearing such as an air bearing, and to a process for preparing same.

BACKGROUND OF INVENTION

Bearings are needed in any machine employing a rotating member such as a shaft or thrust runner. They provide a stabilizing force, by providing damping or balancing forces on the rotating member of the machine during operation. Conventional roller and ball bearings have generally been used to provide these stabilizing functions needed during the operation of, for example, a high-speed machine such as a gas turbine engine. Air bearings present a desirable alternative to these conventional bearings, because they eliminate undesirable vibration resulting from the presence of the bearings within the machine, and they are maintenance free.

U.S. Pat. No. 4,950,089 to Jones discloses a compliant foil bearing comprising a relatively thin bearing foil that is supported in juxtaposed relation to both a shaft and a bearing housing by a pair of sinusoidally folded spacer foils. A single bearing foil is hydrodynamically spaced from and related to both the bearing housing and the shaft. In addition, the patent states that the spacer elements provide for radial deflection of the bearing foil in accordance with the pressure profile of the hydrodynamic gas film so as to provide maximum load carrying capacity, to tolerate bearing misalignment and skew loads, and to tolerate thermal distortions.

U.S. Pat. No. 4,415,281 to Agrawal discloses a hydrodynamic fluid film bearing including a stationary retaining member, a rotating member and a foil element therebetween. The bearing includes a resilient backing member which has a bilinear spring constant associated with it, adjacent the foil element. The spring is of periodic shape and comprises a first and a second series of corrugations, wherein the amplitude of the second corrugation is substantially less than that of the first corrugations. The bearing is said to achieve enhanced damping with minimum power loss at all speeds of operation as well as improved load capacity, and resistance to rotating member excursions and instabilities due to shaft imbalances and other disturbances.

U.S. Pat. No. 4,552,466 to Warren discloses an air bearing structure which is said to prevent destructive bending moments within the top foil. A top foil member is supported by a bump foil made from Inconel X-750. The bumps are formed by a curved die in an annealed condition.

U.S. Pat. No. 4,462,700 to Agrawal discloses a hydrodynamic fluid film thrust bearing including a stationary thrust plate, and a rotating thrust runner spaced therefrom. A set of corrugated springs is disposed between the thrust runner and the thrust plate.

U.S. Pat. No. 4,295,689 to Licht discloses a fluid-film journal bearing which includes a resilient foil insert assembly mounted in the bore of a retaining member and having a bearing surface of a rotatable journal. The retaining member has a slit extending tangential to the bore with associated means for retaining the foil and for varying the bearing clearance. The foil is coiled within the annular space between the retainer and the journal and is comprised of three integral sections comprising an outermost plain portion, an intermediate undulated or wave portion, and a plain inner portion. The wave portion is formed in the shape of successive, undulating curves having alternating peaks and valleys. The patent states that it is possible to fabricate an almost infinite variety of forms for the wave portion by changing the wavelength $\Lambda$, the peak-to-peak amplitude A and/or the local radius of curvature $R_{(s)}$, where s is the distance along the undulation, which enables one to vary the stiffness of the resilient backing and the damping of the foil element.

Plastic air bearings have been made by KMC, Inc., of Newport, R.I. These were machined to provide thickness variations and are not believed to have been capable of the "oil-canning" function.

While the need for air bearings exists, they are difficult to make and no method known provides an inexpensive, efficient and cost effective way of producing them. Consequently, their use has been very limited for applications which require tight tolerances, such as precision gauging and precision machines.

SUMMARY OF THE INVENTION

It is an object of the invention to provide a fluid bearing such as an air bearing which has low cost and high tolerance, and is light-weight.

It is a further object of the invention to provide such a bearing which is useful for devices requiring high precision.

It is still a further object of the invention to provide a maintenance free fluid bearing which will eliminate vibration during the operation of a machine.

It is another object of the invention to provide a fluid bearing which can be rotated in either direction.

It is yet another object of the invention to provide an inexpensive, efficient and cost effective method of making a fluid bearing such as an air bearing.

These objects and others are provided by a fluid bearing such as an air bearing which can be axially loaded or thrust loaded and which can be used to support shafts which can be rotated in either direction. The bearing includes an undulatory spring. Hill-like portions of the spring preferably have a smaller radius of curvature than valley-like portions of the spring. Preferably, the thickness of the spring is greater in the horizontal portions than in the vertical portions. Most preferably, the spring is made by an electroforming process of the invention.

DETAILED DESCRIPTION OF PREFERRED EMBODIMENTS

A bearing of the present invention is constituted by a relatively stationary member and a relatively movable member. These members may be in the form of concentrically arranged cylinders (an axially loaded bearing), opposed annular plates (a thrust loaded bearing), or the like. Interposed between the relatively stationary member and the relatively movable member is a flat metal or metal alloy foil or spring having an undulating cross-section of alternating hill-like shapes and valley-like shapes. In operation, the motion of the relatively movable member distorts the spring to create a fluid film such as an air film between the spring and at least one of the relatively movable members.

Figure 2:
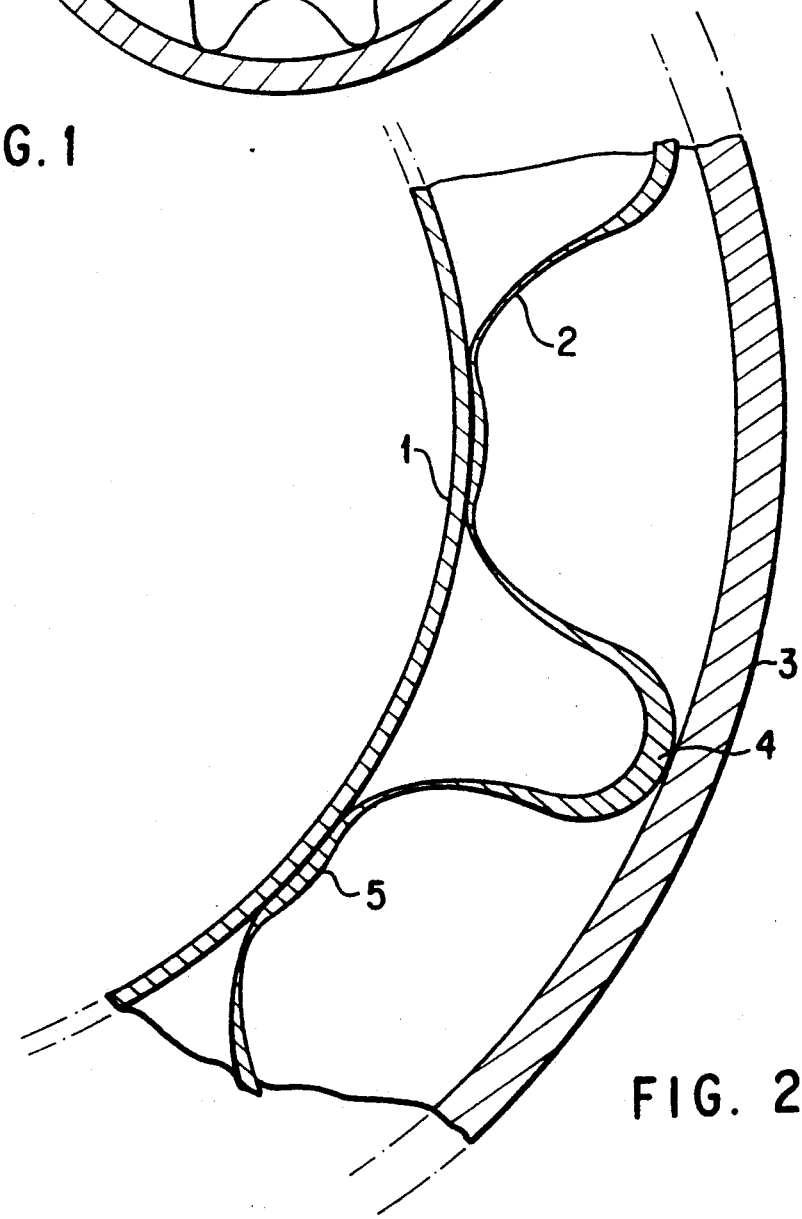
FIG. 2 is an expanded cross-sectional view of a portion of the air bearing of FIG. 1.

The spring of the invention is preferably configured such that the radius of curvature of the valley-like shapes is larger than the radius of curvature of the hill-like shapes. It is also preferred that the thickness of the spring increases from the sides of the valley-like shapes toward the top of the hill-like shapes and is greatest at the top of the hill-like shapes. The bottoms of the valley-like shapes are also thicker than the sides thereof. The valley-like shapes extend toward the relatively movable member and the hill-like shapes extend toward the relatively stationary member. This configuration provides an "oil-canning" effect in use with deformation as shown in FIG. 2 providing a lubricating fluid film. "Oil-canning" refers to the property of a spring material of snapping into a repeatable deformed position upon application of a force, and snapping back out of that position of its own volition upon removal or sufficient reduction of the force.

In the most preferred embodiment, each of the above elements of the air bearing is made by electroformation. It is particularly desirable that the spring be electroformed. Electroformation of all of the air bearing components provides significant advantages in dimensional tolerances, low cost and light weight of the parts. Electroforming of the spring enables the cost effective fabrication of the spring with substantially any desired radius or length, preferably in an endless, dual directional configuration.

Figure 1:
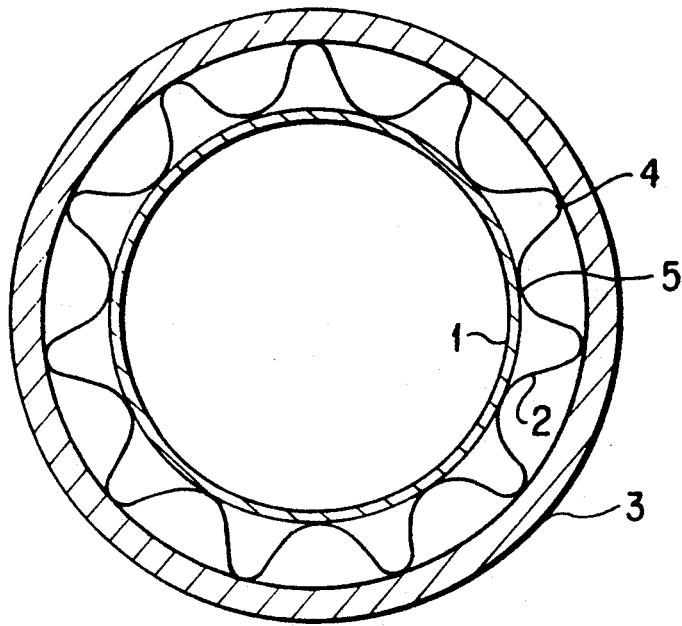
FIG. 1 is a cross-sectional view of an axial loaded air bearing of the invention at rest.

Referring to FIGS. 1 and 2, a cross-sectional view of an axial loaded air bearing is shown at rest. The axial or center component 1 is shown as a thin walled, non-filled electroform. In an alternative embodiment, the axial or center component may not be electroformed and/or may be filled. A continuous electroformed spring 2 is located between the inner component 1 and the outer component 3. Outermost component 3 is an electroformed sleeve. In an alternative embodiment, the sleeve may not be electroformed.

As can be seen in FIGS. 1 and 2, the hill-like shapes 4 have a smaller radius of curvature than the valley-like shapes 5. As can best be seen in FIG. 2, the thickness of the spring in the hill-like shapes 4 is greater than the thickness of the spring in the valley-like shapes 5. This configuration enables the deformation of the spring needed to form a usable fluid film such as an air film.

Figure 3:
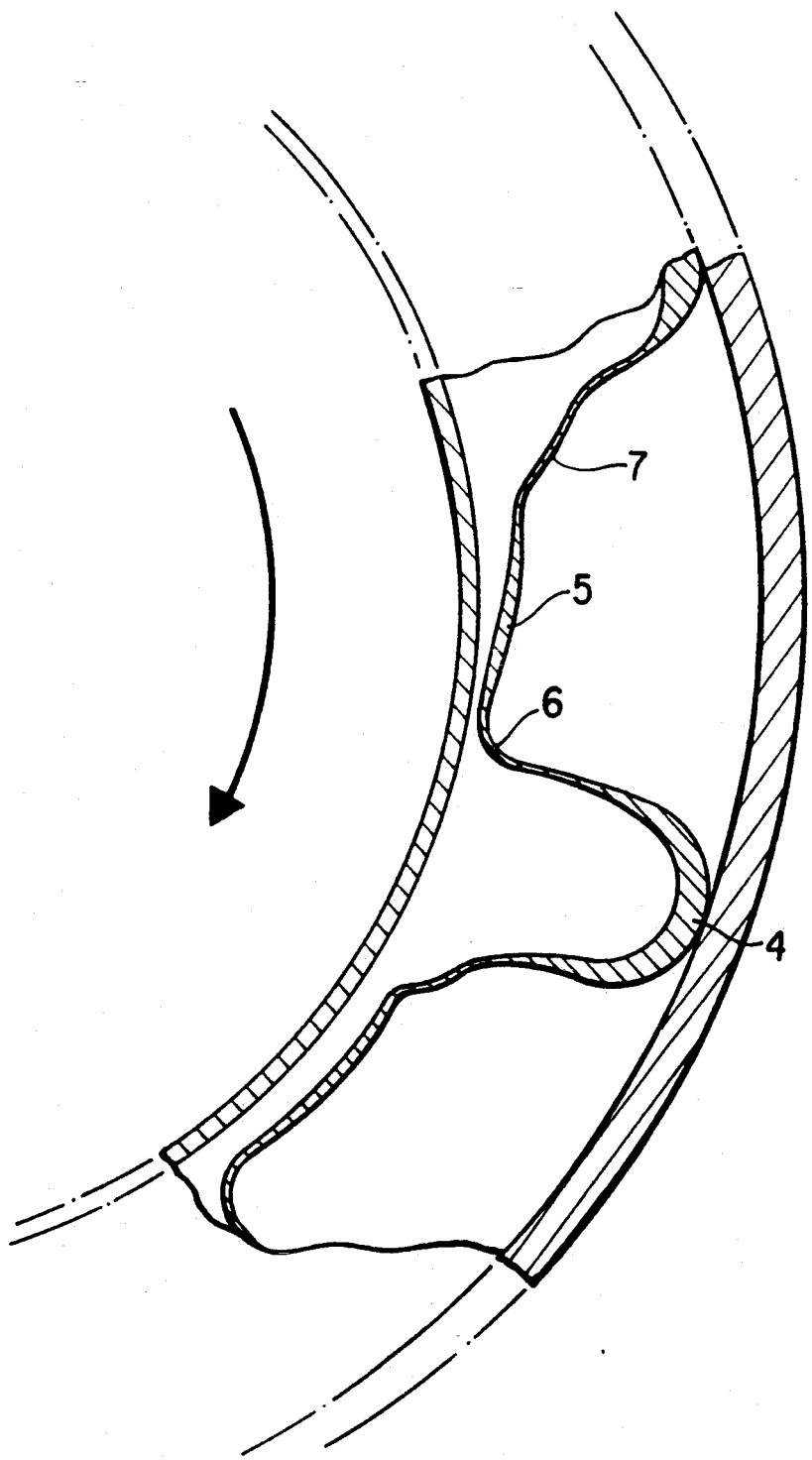
FIG. 3 is a cross-sectional view of an axial loaded air bearing of the invention in use.

FIG. 3 shows an axially loaded air bearing of the invention in operation. As force is applied, the air bearing deforms because of the motion which occurs within the air bearing. The symmetry of the air bearing allows it to operate in either a clockwise or counterclockwise direction. The spring sections 5 which point toward the center of the air bearing deform identically because they have identical wall thickness variations. The leading edge 6 deforms outwardly and the trailing edge 7 deforms inwardly, which results in the shape desirable for forming the air film necessary for this type of bearing.

Figure 4:
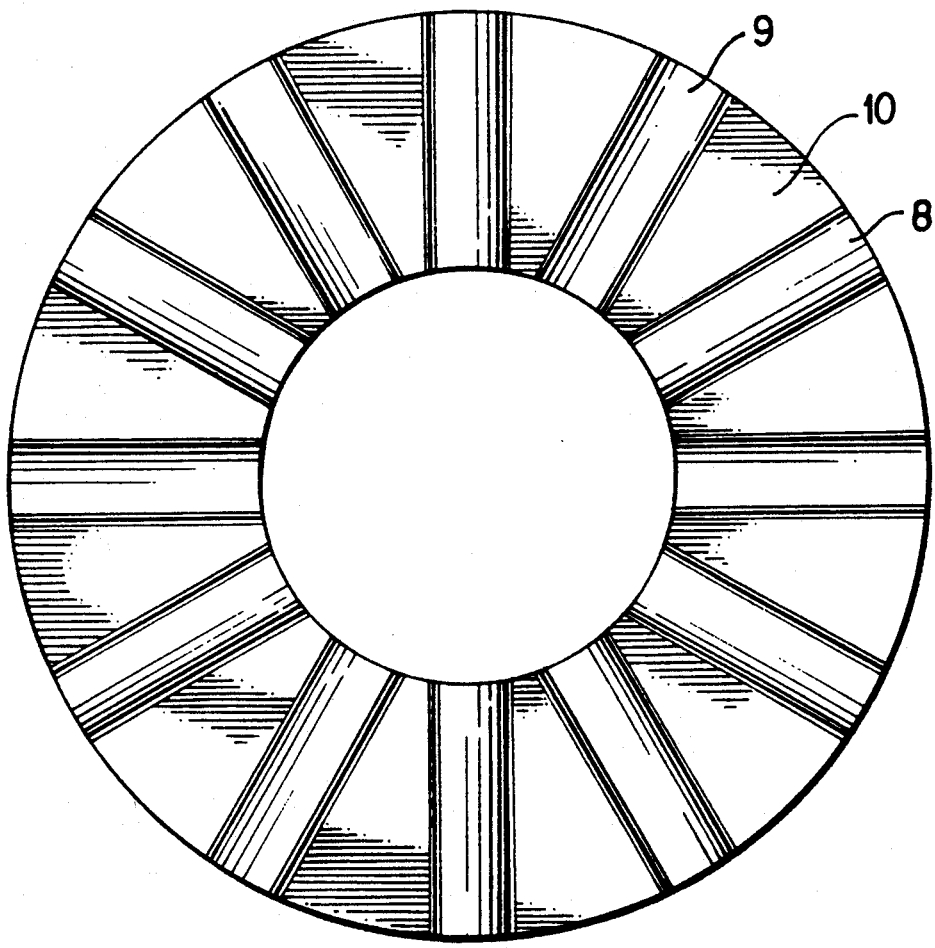
FIG. 4 is a plan view of a spring for a thrust-loaded air bearing of the invention at rest.
Figure 5:
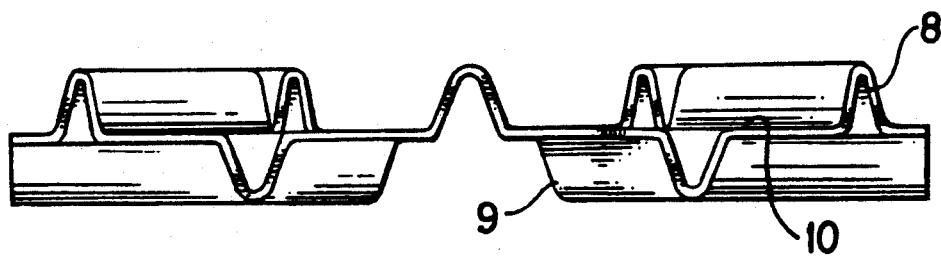
FIG. 5 is a cross-sectional view of the spring of FIG. 4.

FIGS. 4 and 5 depict the central component or spring of a thrust loaded air bearing of the invention. The geometry of the cross section of each section is similar to that of the axially-loaded embodiment in that the smaller radius hill-like sections 8 with thicker walls are positioned toward the relatively stationary member, and the larger radius valley-like sections 9 are positioned toward the relatively movable component. In the depicted embodiment, the hill-like sections and valley-like sections are separated by optional level sections 10. This embodiment can also be dual directional in view of its symmetry.

The dimensions of the spring are determined by the dimensions of the bearing. For example, in some embodiments the spring is less than 3 mm thick, while in other embodiments the spring can be much thicker, depending on the ultimate use of the bearings. For example, for light duty bearings, thicknesses of 75 to 125 micrometers are preferred. Selection of appropriate parameters for the desired product is within the capabilities of one of ordinary skill in the art without undue experimentation, taking into account the design load, speed, materials, fluid media (e.g., air, helium, nitrogen, hydrogen, etc.) and the like.

In the process of the invention, a thin metal layer is electrodeposited on an electrode which thereby forms a metal member in conformance with the outer surface of the electrode. In this manner, the metal member generally replicates the surface of the electrode. However, the thickness of the electroform will vary as a function of the geometry of the mandrel and the anode. With a relatively uniform annular anode (which can be ensured by the mandrel movement discussed herein), the thickness variations of the electroform will be determined mainly by the geometry of the mandrel. The tops of the hill-like shapes, which are closest to the anode, will have the thickest deposits. The thickness will taper down as the distance from the top of the hill-like shapes increases. However, the bottoms of the valley-like shapes will also have increased thickness relative to their sides, and this thickness increases with increased width of the valley-like shapes.

Optimum shapes and thickness are achieved if the valley-like shapes are about twice as wide as they are deep (measured respectively along and normal to a plane which connects the tops of adjacent hill-like shapes). In a particularly preferred embodiment, the width of the valley-like shapes is approximately twice the width of the hill-like shapes. As the depth of the respective hills and valleys increases, this ration preferably also is increased.

The process of the invention may employ an electroforming process similar to that described in U.S. Pat. Nos. 3,844,906 and 4,501,646, the entire disclosures of which are hereby totally incorporated by reference.

The electroforming process takes place within an electroforming zone comprised of an anode selected from a metal and alloys thereof, a cathode which is the mandrel, and an electroforming bath comprising a salt solution of the metal or alloys thereof which constitutes the anode. Both the anode and the cathode are immersed in the bath.

Any suitable metal or metal alloy capable of being deposited by electroforming and having spring properties or being treatable (e.g., by heat treatment) to have spring properties may be used to form the springs of the invention. Metals and metal alloys having a coefficient of expansion between $6 \times 10^{-6}$ in./in./°F. and about $10 \times 10^{-6}$ in./in./°F. may preferably be used in the process of this invention. Preferably the electroformed metal has a ductility of at least about 0.5% elongation in a two inch pull. Typical metals and alloys that may be electroformed to form the spring include nickel, stainless steel, copper beryllium, iron, copper, and brass. Metals and metal alloys provide good lubricating and wear properties, and conduct heat.

The mandrel is preferably solid and of large mass to reduce cooling of the mandrel while the deposited coating is cooled. In such an embodiment, the mandrel should have high heat capacity, preferably in the range from about 3 to about 4 times the specific heat of the electroformed material. This determines the relative amount of heat energy contained in the electroformed article compared to that in the mandrel.

Further, the mandrel in such an embodiment should exhibit low thermal conductivity to maximize the difference in temperature between the electroformed article and the mandrel during rapid cooling of the electroformed article to prevent any significant cooling and contraction of the mandrel.

For an axially by loaded bearing spring, the metal member formed can be made to deform to have a circumference which is larger than the mandrel which will not easily deform. Thus, it is not necessary to use a tapered mandrel to facilitate separation of the electroformed spring from the mandrel. A tapered mandrel will produce a tapered spring which would not work very well with the other components if they were not identically tapered. However, it is possible to electroform all of the parts to have an identical taper which would also facilitate parting. Separation can be further facilitated by using a mandrel which is chiefly fabricated of a material which has a linear coefficient of thermal expansion which is larger or smaller than the linear coefficient of thermal expansion of the metal member. To separate a metal member made on a mandrel with a linear coefficient of thermal expansion which is less than that of the metal member, the metal member and the mandrel may be heated to obtain a parting gap, although this is generally not necessary in electroforming of the spring.

This relationship can be expressed in the following manner:

$$PARTING\ GAP = \Delta T(A_M - \alpha_d)D$$

wherein $\Delta T$ is the difference between the parting temperature and the deposition temperature, $A_M$ is the linear coefficient of thermal expansion of the mandrel, $\alpha_d$ is the linear coefficient of thermal expansion of the deposit, and $D$ is the outside diameter of the mandrel at the deposition temperature.

The electroforming process of this invention may be conducted in any suitable electroforming device. For example, a solid cylindrically shaped mandrel with a surface having hill-like and valley-like portions corresponding to those of the spring may be suspended vertically in an electroforming tank. The mandrel is constructed of electrically conductive material that is compatible with the metal plating solution (e.g., stainless steel). The top edge of the mandrel may be masked off with a suitable, non-conductive material, such as wax, to prevent deposition.

The electroforming tank is filled with the electroforming bath and the temperature of the bath is maintained at the desired temperature. The electroforming tank can contain an annular shaped anode basket which surrounds the mandrel and which is filled with metal chips. The anode basket is disposed in axial alignment with the mandrel. The mandrel is connected to a rotatable drive shaft driven by a motor. The drive shaft and motor are supported by suitable support members. Either the mandrel or the support for the electroforming tank may be vertically and horizontally movable to allow the mandrel to be moved into and out of the electroforming solution.

Electroforming current can be supplied to the tank from a suitable DC source. The positive end of the DC source can be connected to the anode basket and the negative end of the DC source connected to the drive shaft which supports and drives the mandrel. The electroforming current passes from the DC source connected to the anode basket, to the plating solution, the mandrel, the drive shaft, and back to the DC source.

In operation, the mandrel is lowered into the electroforming tank, and is preferably continuously oscillated. This oscillation should occur so that no portion of the mandrel is directly across from the same part of the anode more than it is across from all other portions. That is, on average, all parts of the mandrel surface should spend an equal amount of time directly across from all parts of the anode. This ensures symmetry in the deposit while compensating for nonsymmetry in the electrolytic cell. While this condition can easily be obtained by simply rotating the mandrel continuosly in one direction, this is not preferred as the deposit made on the trailing edges of the hills will become pitted as circulation (bath agitation) will be inhibited in the lee of the hills. This may be acceptable (but not preferred) for undirectional bearings, but is strongly disfavored for bidirectional bearings. Preferably, symmetry in the deposit is achieved in the total absence of symmetry in the oscillation (random oscillation) or in the presence of carefully programmed oscillation. The period of oscillation (that is, the duration of rotation in one direction before reversing direction) to avoid gas pitting will vary depending on how high the hills are in relation to the valleys, the current density, the solution flow, etc. As the mandrel oscillates back and forth, a layer of electroformed metal is deposited on its outer surface. The electroformed metal member is brought to its desired dimensions by allowing this process to continue. After the desired thicknesses are obtained the current flow is terminated.

When the electroforming process is complete, the mandrel is removed from the electroplating tank and immersed in a cold water bath. The temperature of the cold water bath is preferably between about 80° F. and about 33° F. A large difference in temperature between the temperature of the cooling bath and the temperature of the coating and mandrel maximizes permanent deformation due to the stress-strain hysteresis effect. When the mandrel is immersed in the cold water bath, the deposited metal may be cooled prior to any significant cooling and contracting of the solid mandrel to impart an internal stress of between about 40,000 psi and about 80,000 psi to the deposited metal. Since the metal is selected to have a stress-strain hysteresis of at least about 0.00015 in/in, it is permanently deformed, so that after the mandrel is cooled and contracted, the deposited metal may be easily removed from the mandrel. As the mandrel shrinks after permanent deformation of the deposited metal, the metal may be readily slipped off the mandrel. As discussed herein, however, these steps are not necessary in formation of a spring in view of the ready separability of a spring from a mandrel.

Thrust bearing springs may be electroformed on "flat" plates (which are appropriately machined with the aforementioned hills and valleys), for instance the "flat" end of a cylindrical shaft. For example, a stainless steel mandrel may be lowered into a bath with an anode located on the bottom of the bath, and the mandrel is oscillated. The mandrel preferably has large (e.g., 0.75 inch to 1.5 inch) margins to capture edge effects, and the deposit which forms on the margins is trimmed away after separation from the mandrel. (Other electroforms preferably also have borders for the same reason.) Preferably, the tank and mandrel are cylindrical, and the mandrel is preferably located about one to two and a half inches, preferably about two inches, above the anode during deposition.

Although the invention has been described with reference to specific preferred embodiments, it is not intended to be limited thereto. Those skilled in the art will recognize that variations and modifications can be made therein which are within the spirit of the invention and within the scope of the claims.

What is claimed is:

1. A process of preparing a spring for a fluid bearing, comprising the steps of:
   immersing an electrode in an electroforming bath, said electrode having an outer surface having an undulating cross-section of hill-like and valley-like shapes; and
   electrodepositing a thin metal or metal alloy layer on said surface of said electrode in conformance with said surface to form said spring, wherein the metal layer is thinner at the bottom of said valley-like shapes than at the top of said hill-like shapes.

2. The process of claim 1, wherein said valley-like shapes have a larger radius of curvature than do said hill-like shapes.

3. The process of claim 1, wherein said electrode is subjected to oscillation during the electrodepositing step.

4. The process of claim 3, wherein said oscillation ensures that, on average, all of said surface of the electrode spends an equal amount of time in confrontation with all opposing surfaces of an anode.

5. The process of claim 4, wherein said oscillation is random bidirectional oscillation.

6. The process of claim 1, wherein said valley-like shapes are about twice as wide as said hill-like shapes.

7. The process of claim 1, wherein said valley-like shapes are about twice as wide as they are deep.

8. The process of claim 1, wherein said fluid bearing is an air bearing.

9. The process of claim 1, wherein said surface is a substantially flat or conical surface containing said shapes.

10. The process of claim 9, further comprising trimming a radially outer margin from said spring.

11. The process of claim 1, wherein said surface is a substantially cylindrical surface containing said shapes.

12. A spring for a fluid bearing, said spring being prepared by a process comprising the steps of:
    immersing an electrode in an electroforming bath, said electrode having an outer surface having an undulating cross-section of hill-like and valley-like shapes; and
    electrodepositing a thin metal or metal alloy layer on said electrode in conformance with said outer surface wherein the metal layer is thinner at the bottom of said valley-like shapes than at the top of said hill-like shapes.

13. The spring of claim 12, wherein said valley-like shapes have a larger radius of curvature than do said hill-like shapes.

14. The spring of claim 12, wherein said valley-like shapes are about twice as wide as said hill-like shapes.

15. The spring of claim 12, wherein said valley-like shapes are about twice as wide as they are deep.

16. The spring of claim 12, wherein said fluid bearing is an air bearing.

17. The spring of claim 12, wherein said spring is a substantially flat or conical spring for a thrust bearing.

18. The spring of claim 12, wherein said spring is a substantially cylindrical spring for an axially loaded bearing.

* * * * *